United States Patent
McDonald et al.

(10) Patent No.: US 6,560,627 B1
(45) Date of Patent: May 6, 2003

(54) MUTUAL EXCLUSION AT THE RECORD LEVEL WITH PRIORITY INHERITANCE FOR EMBEDDED SYSTEMS USING ONE SEMAPHORE

(75) Inventors: Michael F. McDonald, San Jose, CA (US); Sumeet Arora, Milpitas, CA (US); Mark Chu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/239,499

(22) Filed: Jan. 28, 1999

(51) Int. Cl.[7] .................................................. G06F 9/00
(52) U.S. Cl. ........................ 709/103; 709/104; 709/100
(58) Field of Search ................................ 704/100, 101, 704/102, 103, 104, 108; 710/200, 41

(56) References Cited

U.S. PATENT DOCUMENTS

| | | | | |
|---|---|---|---|---|
| 5,530,903 A | * | 6/1996 | Calvignac | 710/41 |
| 5,991,845 A | * | 11/1999 | Bohannon et al. | 710/200 |
| 6,237,019 B1 | * | 5/2001 | Ault et al. | 709/104 |

* cited by examiner

*Primary Examiner*—Majid Banankhah
(74) *Attorney, Agent, or Firm*—Blakely, Sokoloff, Taylor & Zafman LLP

(57) ABSTRACT

A method for providing mutual exclusion at a single data element level for use in embedded systems. Entries for tasks that are currently holding a resource are stored in a hold list. Entries for tasks that are not currently executing and are waiting to be freed are stored in a wait list. A single mutual exclusion semaphore flags any request to access a resource.

24 Claims, 7 Drawing Sheets

MUTUAL EXCLUSION AT THE RECORD LEVEL WITH PRIORITY INHERITANCE FOR EMBEDDED SYSTEMS USING ONE SEMAPHORE

FIELD OF THE INVENTION

The present invention relates generally to computer software, and more specifically to providing efficient mutual exclusion of multiple tasks in an embedded system.

BACKGROUND OF THE INVENTION

Real time embedded software applications are often divided into individual tasks that execute independently. In typical applications, these tasks operate on data that is global to the application, or to more than one of the application's tasks. Global data is often organized into groupings of like records. Each record is a data structure that represents a collection of fields or elements. Global data may consist of thousands of records, each representing an instance of something the application must manage. To ensure data integrity and proper operation of the application, access to one record must not interfere in any way with access to any other record. In systems in which one task is preempted in order to allow another task to run, the probability of data corruption and/or race conditions occurring is often unacceptably high. To prevent these conditions from arising, some form of mutual exclusion is required.

In distributed processing and other multi-user or multi-task applications, record locking is used to control reading data from or writing data to a record. A mutual exclusion record locking mechanism helps to ensure that only one program or routine at a time can access a record. In general, multiple read locks on a record are allowed simultaneously, while only one write lock per record is permitted at any one time. A read lock must be refused if another task has a write lock on a record, and vice versa. Thus, both read locks and write locks are record accesses.

Because of performance considerations, real time embedded software applications impose strict requirements on mutual exclusion mechanisms. For example, a mutual exclusion mechanism cannot consume significant memory, nor can it impose a significant amount of processing overhead. Although actual requirements vary in terms of the available memory and processing power of the system, the mechanism must in general not be wasteful.

Furthermore, in most applications, the mutual exclusion mechanism must support priority inheritance. If a low priority task holds a resource, and a higher priority task requests that resource, the priority of the low priority task should be elevated to that of the high priority task until it task releases the resource. Once the resource is released, priorities should revert to their original levels. In general, it is also desirable for the mutual exclusion mechanism to be able to detect and/or prevent deadlock. In a multi-tasking environment several tasks may compete for a finite number of resources. A task requests resources; if the resources are not available at that time the tasks enters the wait state. It may happen that waiting tasks will never again change state, because the resources they have requested are held by other waiting tasks. This situation is called deadlock. For example, deadlock occurs when a first task requests a record held by a second task while the second task is simultaneously requesting a record held by the first task. The result is neither task has its request answered. Such an occurrence could cause the application program or system software to crash.

Present operating systems typically employ mutual exclusion schemes that include one or more of the following mechanisms: semaphores, mutexes, or preemption locks. Each of these mechanisms possess disadvantages that limit their utility in real-time embedded system applications.

Basic mutual exclusion systems use semaphores, which are flags used in programs to coordinate the activities of more than one program or routine. Since one semaphore is required for each routine or resource that is to be protected, the use of semaphores may require significant memory usage. In certain applications, the number of semaphores may be limited in number by the operating system. For example, some operating systems provide a limited number of semaphores, and may not be designed to work well in an environment where many thousands would be required for record-level locking.

Mutexes are similar to semaphores but are related to the use of operating system threads. Therefore implementation of mutual exclusion through mutexes requires the application to use threads rather than tasks. Since threads, and therefore mutexes, are not universally supported by all operating systems, applicability of this approach is limited. Moreover, mutexes generally exhibit the same memory usage disadvantages as semaphores.

Preemption locks are used to prevent a current task from being preempted during a critical region. This mechanism basically elevates the task with a lock to the highest possible priority. In a real time environment, this is generally unacceptable, as a very low priority task can prevent a high priority task from running for a significant amount of time, and embedded systems typically require that critical system events be processed with as little delay as possible.

SUMMARY AND OBJECTS OF THE INVENTION

One of the objects of the present invention is to provide a mutual exclusion mechanism that allows read/write locking at the record level.

Another of the objects of the present invention is to provide a mutual exclusion mechanism that provides record locking with minimal memory and processor bandwidth requirements.

A further object of the present invention is to provide a record locking mechanism that both detects and prevents deadlock.

In one embodiment of the present invention, a method of providing mutual exclusion at a single data element level for use in embedded systems is described. Entries for tasks that are currently holding a resource are stored in a hold list. Entries for tasks that are not currently executing and are waiting for resources to be freed are stored in a wait list. A single mutual exclusion semaphore synchronize any request to access a resource.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A system is described that provides mutual exclusion of multiple tasks at the record level with priority inheritance and using one semaphore.

Figure 1:
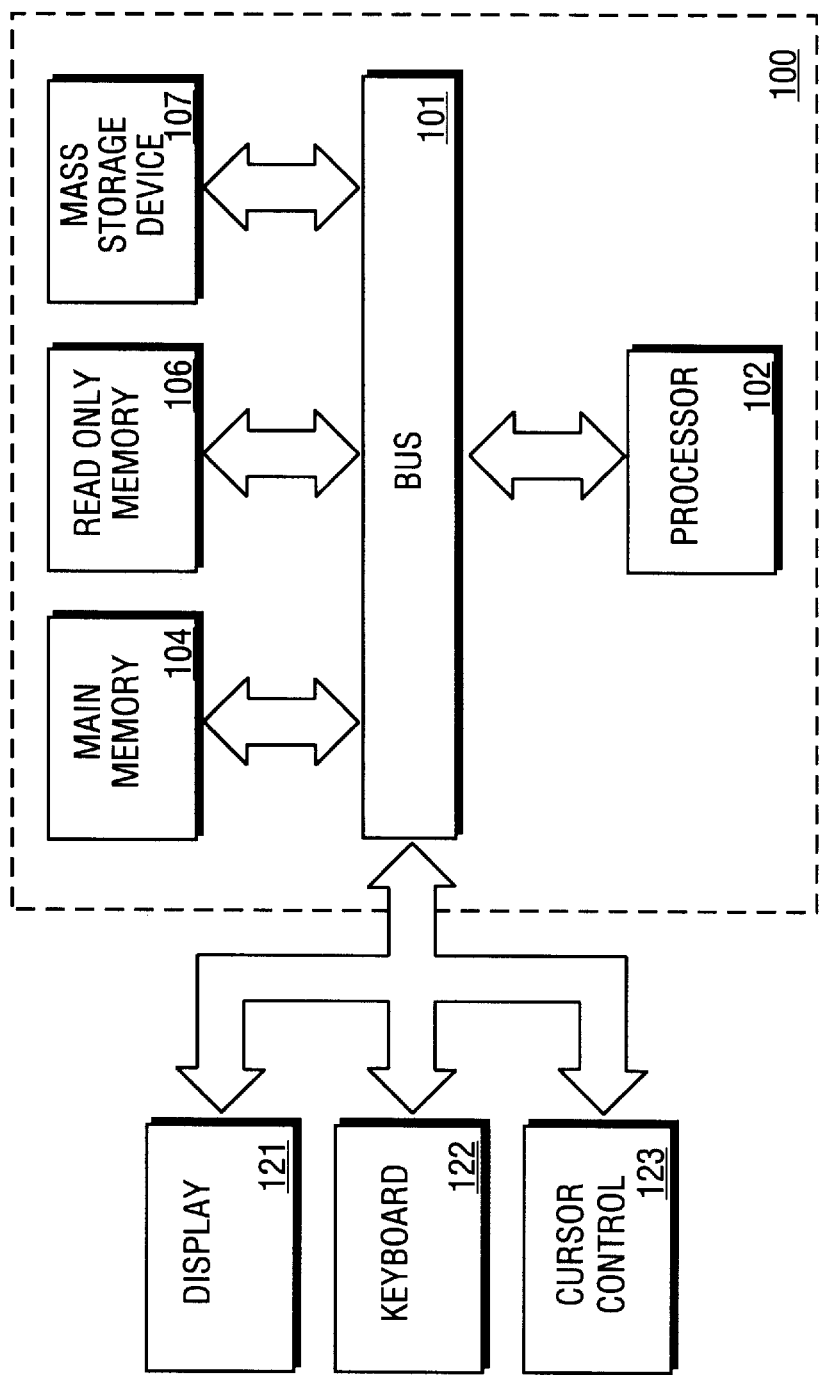
FIG. 1 is a block diagram of a computer system that is used to implement embodiments of the present application.

FIG. 1 is a block diagram of a representative computer system that is used to implement the mutual exclusion mechanism of an embodiment of the present invention. The computer system 100 includes a processor 102 coupled through a bus 101 to a random access memory (RAM) 104, a read only memory (ROM) 106, and a mass storage device 107. Mass storage device 107 is typically implemented as a disk or tape drive for storing data and instructions. A display device 121 for providing visual output is also coupled to processor 102 through bus 101. Keyboard 122 is coupled to bus 101 for communicating information and command selections from the user to processor 102. Another type of user input device is cursor control unit 123, which may be a device such as a mouse or trackball, for communicating direction commands that control cursor movement on display 121.

It is to be noted that the architecture of FIG. 1 is provided only for purposes of illustration, and that a computer system that implements embodiments of the present invention is not limited to the specific architecture shown.

In one embodiment of the present invention, computer system 100 represents an embedded system. In general, an embedded system is a special-purpose computer that is incorporated within or controlled by a machine or other type of equipment. Embedded systems are typically used to execute real-time applications that include multiple tasks that require deterministic access to system resources. Real time applications thus typically require very fast context switch times among the various tasks and resources that are accessed and managed by the applications. Furthermore, these applications are typically executed by embedded systems that are used in low-cost or low-power applications, and thus feature limited memory and/or processor resources. Thus, embedded systems are characterized by high performance and low resource utilization requirements.

Embedded system software applications or programs are generally organized into tasks. Each task is an independent or nearly independent entity that accesses one or more system databases. In a typical embedded system, the system databases are accessed by multiple tasks. Data within the databases may be organized in various different ways. In general, the fundamental unit within a database is referred to as a "record". A record is a data structure that consists of a number of sub-elements (or fields), each with its own name and type. A group of like records can be organized into a record group. The application data generally comprises all records groups (and thus all the data) maintained by a software application.

In one embodiment of the present invention, the system is configured to treat each entity, such as a record or record group, as a resource. Each resource therefore represents a logical entity for which mutual exclusion is required to be provided. In one embodiment of the present invention, locking is provided at any resource level. Thus, locking is possible at the record level, record group level, application data level, or any other level.

In one embodiment of the present invention, two lists are maintained within the system. One list is referred to as the "wait list" and contains a list of tasks that are not currently executing and are waiting for a resource to be freed. The second list is referred to as the "hold list" and contains a list of tasks that are currently holding a resource (e.g., a record). These queued lists are used to implement priority inheritance and deadlock prevention within the embedded system applications.

In one embodiment of the present invention, a semaphore is used to ensure the integrity of the wait list and, the hold list. In order to achieve this, any request to lock or unlock a resource is encapsulated within a mutual exclusion semaphore. In one embodiment of the present invention, only one semaphore is used for both the wait list and hold list. In an alternative embodiment of the present invention, more than one semaphore is used. For example, one semaphore may be used with the hold list, and a second semaphore may be used with the wait list, or multiple semaphores may be used depending on the number of tasks or record groups.

Figure 2:
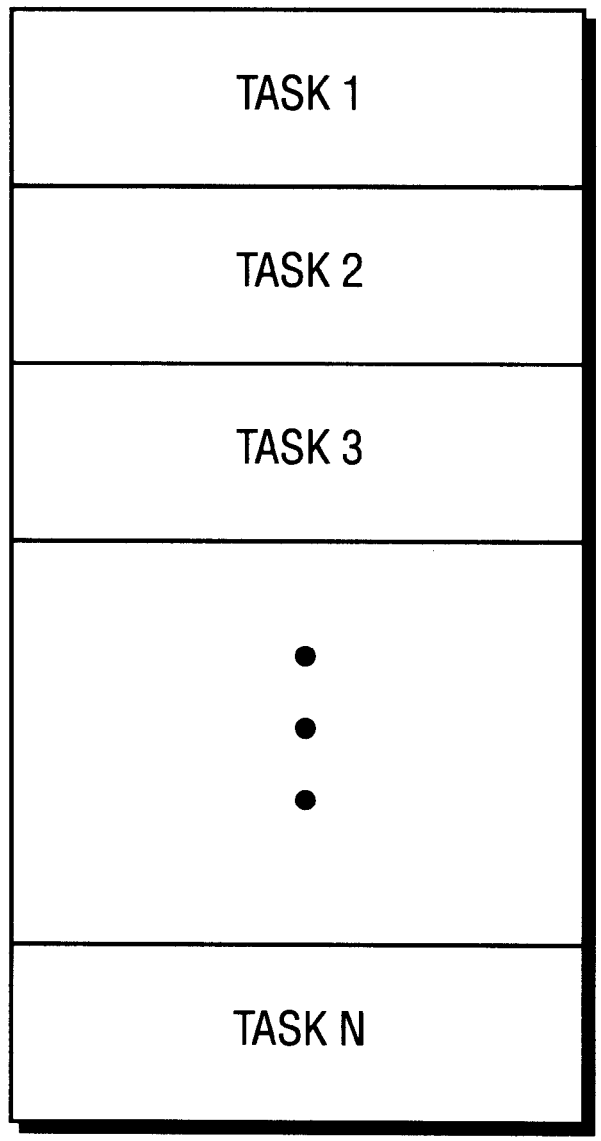
FIG. 2 illustrates the structure and organization of a wait list, according to one embodiment of the present invention.

In one embodiment of the present invention, the wait list is a static list of entries, with one entry per task. This corresponds to the fact that each task can only wait for one resource at a time. FIG. 2 illustrates the structure and organization of a wait list, according to one embodiment of the present invention. In FIG. 2, wait list 200 contains N task entries, labeled tasks 1 to N. Each task in the list is a task that is not currently executing and is waiting for a resource to be freed. The tasks entries are queued in the order of priority to receive the next free resource. Thus, task 1 is of higher priority than task 2, and so on down to task N.

The second list is the hold list. In one embodiment of the present invention, the hold list is a dynamic list organized by record groups. For each record group there is a linked list of resources that are currently held by a task. As defined earlier, resources can be records, record groups or all application data. A task can be waiting for or be holding any of these resource types. In the case where a task is holding a record group, an element in the linked list indicates all resources of this record group.

Figure 3:
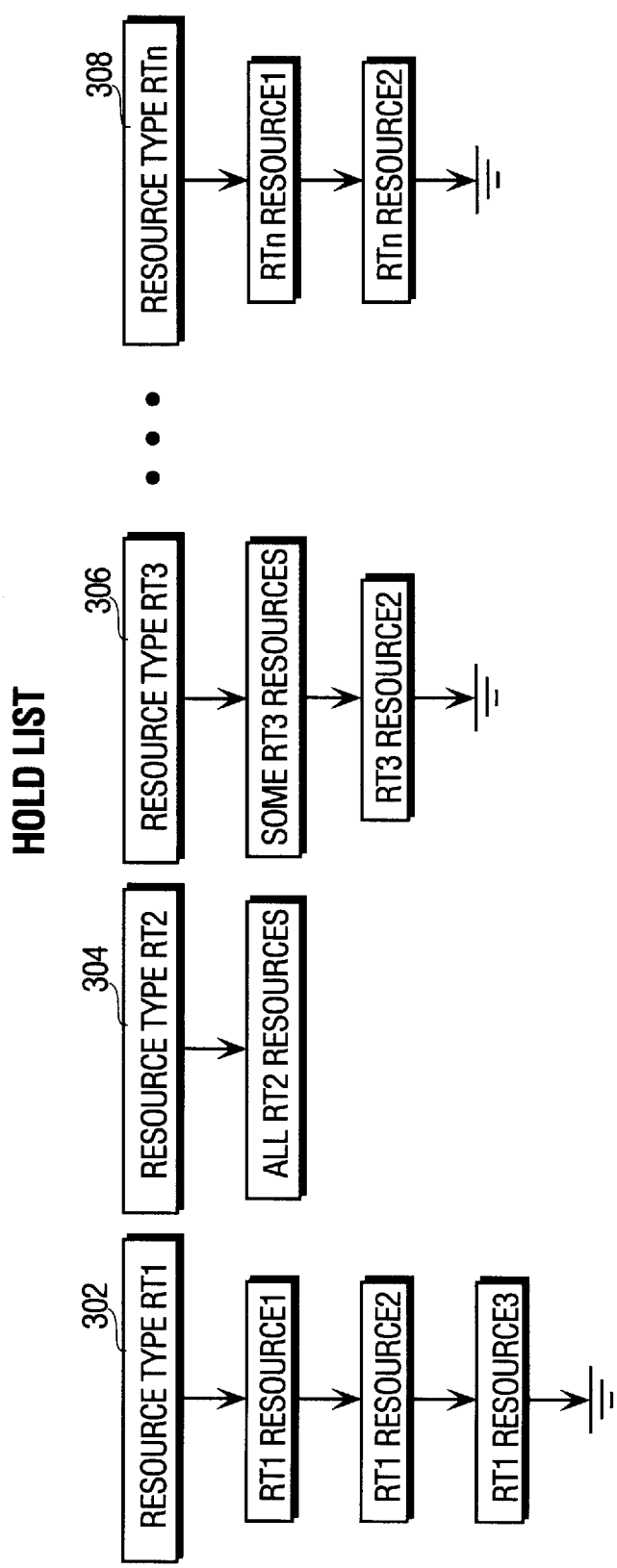
FIG. 3 illustrates the structure and organization of exemplary record group hold lists, according to one embodiment of the present invention.

FIG. 3 illustrates the structure and organization of exemplary record group hold lists, according to one embodiment of the present invention. In FIG. 3, n different lists are maintained for n different resource types denoted Resource Type RT1 to Resource RTn. Each resource type list includes entries for each of the held resources for that resource type. Thus, for the example illustrated in FIG. 3, the hold list for Resource Type 1, 302, contains three resources denoted Resource1, Resource2, and Resource3; the hold list for Resource Type 2, 304, contains all of the type 2 resources; the hold list for Resource Type 3, 306, contains two entries, one for some of the type 3 resources and another for a specific type 3 resource; and the hold list for Resource Type n, 308 contains two type n resources denoted Resource1 and Resource2. The hold list also includes a prioritized listing of tasks that hold the resources. Several items of information about the tasks is included in this list, such as task name, current priority level, original priority level, and other such information.

In one embodiment of the present invention, the wait list and hold list are data structures that are maintained in the system memory, such as random access memory 104 in FIG.

1. Entries within the two lists are modified or updated by the embedded system application or by specialized tasks within the operating system. In an alternative embodiment of the present invention, the wait list and hold list are maintained in non-volatile memory, such as mass storage device 107 or other similar memory, such as a flash memory device.

It is important to note that organizing the embedded system by tasks waiting for a resource to be freed (e.g., as shown in FIG. 1) and/or resources according to resource held for specific resource types (e.g., as shown in FIG. 2) results in efficient memory usage. That is, memory usage is mostly a function of only the number of waiting tasks and/or resource types currently utilized within the system. The memory consumed is therefore typically less than other approaches that, for example, simply store the entire library of all system resources within memory.

Single Record Locking

The following discussion describes the events that occur during various resource locking situations using the wait and hold lists. The simplest situation occurs in which a task attempts to lock a free resource. In one embodiment of the present invention, an attempt to lock a free resource simply results in the resource being added to the hold list for the requesting task. Thus, when task A attempts to lock a resource, and there is no entry in the hold list indicating it is held by another task, then the resource is added to the hold list and task A continues to execute. Likewise, when a task frees a resource, and no other task is waiting for the resource, the task continues to execute and the resource becomes a free resource.

A more complicated situation occurs when a task attempts to lock a held resource. Thus, if a first task ("task A") attempts to lock a resource, and the resource is already held by a second task ("task B"), three main events occur. First, task A is added to the wait list; second, task A is suspended; and third, the priority of task A is compared against the priority of task B so that the priority of task B may be shifted accordingly.

Figure 4:
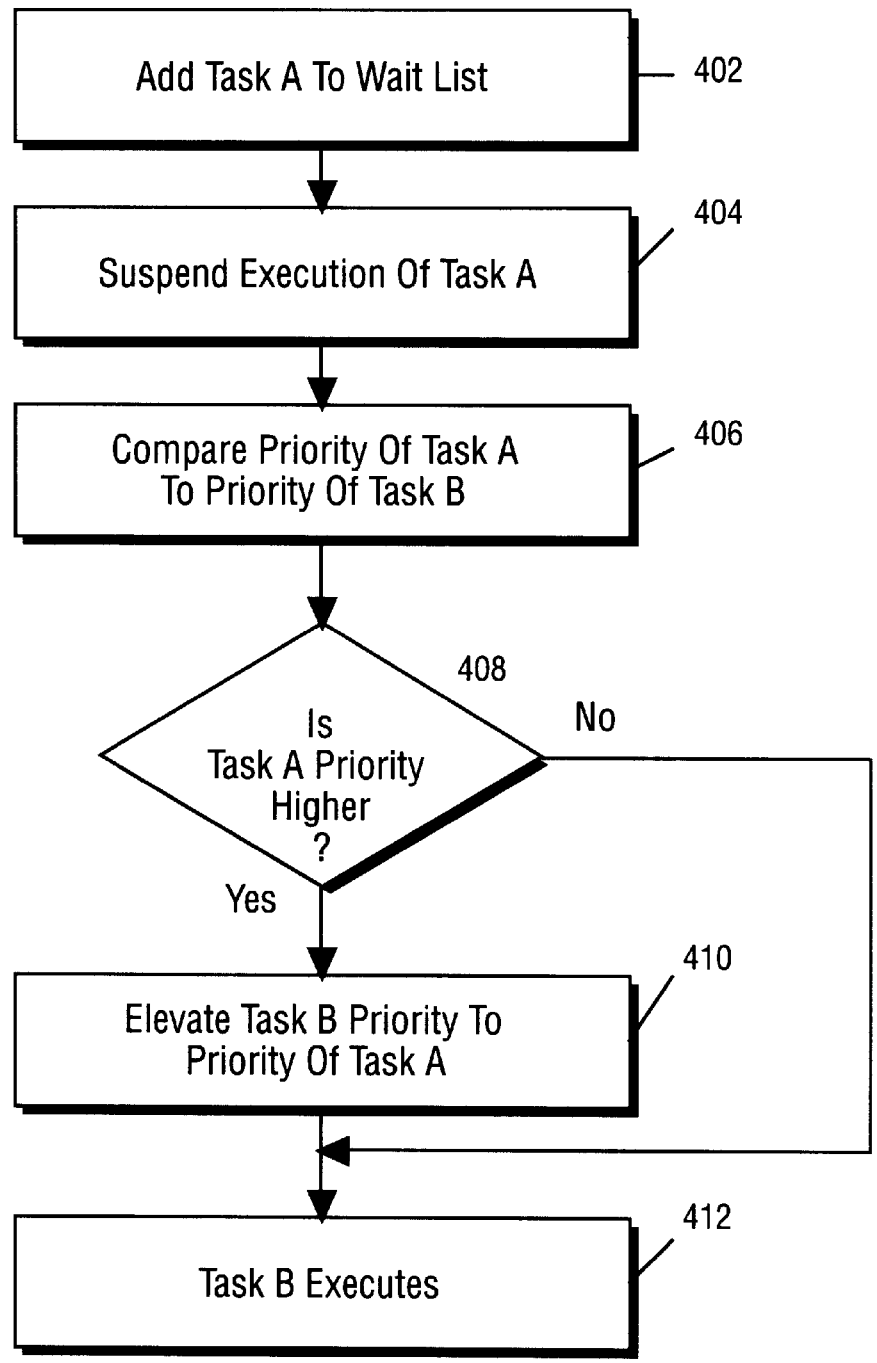
FIG. 4 is a flowchart that lists the steps of locking a single resource, according to one embodiment of the present invention.

FIG. 4 is a flowchart that lists the steps of locking a held resource according to one embodiment of the present invention. As described above, it is assumed that task A is attempting to lock a resource held by task B. In step 402 an entry for task A is written to the wait list. Execution of task A is then suspended, step 404. In step 406, the current priority of task A is compared to the current priority of task B. In step 408 it is determined whether the priority of task A is higher than the priority of task B. If the priority of task A is higher than the current priority of task B, then task B's priority is elevated to that of task A, and the current priority of task B in the hold list is updated to reflect the new priority level, step 410. Once task B inherits the priority of task A, task B continues to execute, step 412.

Figure 5:
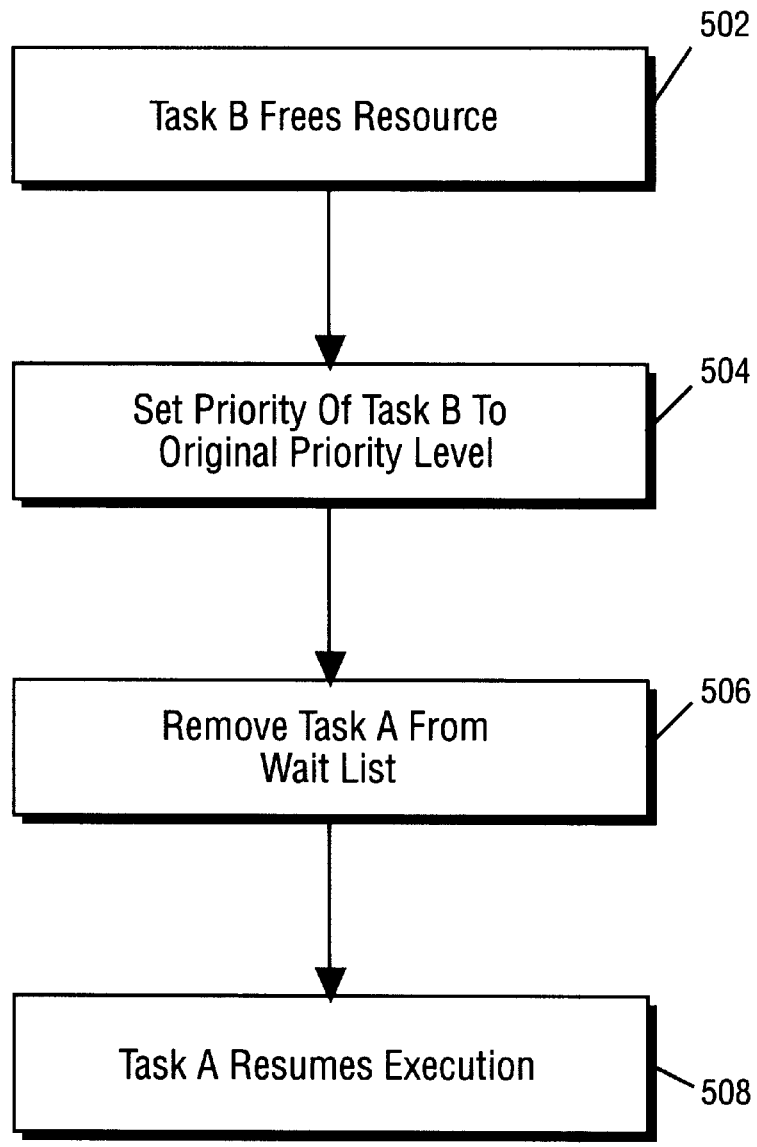
FIG. 5 is a flowchart that illustrates the steps of accessing a held resource, according to one embodiment of the present invention.

FIG. 5 is a flowchart that illustrates the steps of accessing a held resource, according to one embodiment of the present invention. For the discussion of FIG. 5, it is assumed that task B frees a resource that task A is waiting for. In step 502, task B frees the resource. Next, the priority of task B is set to its original, or default, priority, step 504. Task A is then removed from the wait list, step 506. In step 508, execution of task A is resumed.

As described above, in one embodiment of the present invention, a priority inheritance scheme between two or more tasks is implemented. For example, in step 410 of FIG. 4, the current priority level of task B is shifted to that of task A. This priority inheritance mechanism is facilitated by the storage of each tasks' current and original priority in the hold list. The inheritance of a higher priority level by a lower priority task helps to ensure that the second task (the original lower priority task) executes quickly, and thus releases the resource quickly. Priority inheritance also prevents preemption of the second task by a third task. For example, by inheriting task A's priority level, task B will not get preempted by a third task ("task C"), where task C has a lower priority than task A but a higher level than task B's original level. Without such priority inheritance mechanism, task C could be allowed to run indefinitely without allowing task A to re-lock the resource temporarily held by task B.

In one embodiment of the present invention, a mechanism is implemented to prevent deadlock between two or more tasks of the embedded system application. In one embodiment of the present invention, a single lock mechanism is implemented. In the single lock method, a task is allowed to hold only one resource at any given time. The single lock method is relatively simple to implement and incurs relatively little overhead since it involves only a restriction on the resource holding capabilities of each task.

In an alternative embodiment of the present invention, a multiple lock with priority mechanism is implemented. In the multiple lock method, each task is allowed to hold multiple resources. The tasks acquire the resources in a specified order and maintain the priority level of these resources. The multiple lock method overcomes some of the restrictions of the single lock method and accommodates the processing of separate records that are linked or related, and that must be processed together.

Another related embodiment concerns multiple read and single write functionality. That is, if a task requires a resource merely to read it and that same resource is not undergoing a write access, the read request is granted regardless of the number of other tasks also reading or requesting to read the resource. Thus multiple reads are permissible provided no write access is occurring. Write access must maintain mutual exclusion of the resource, however. Thus, write access is granted only if there is no present read or write access concerning the resource.

Another embodiment envisions deadlock detection as opposed to deadlock prevention. As deadlock is not supposed to occur, deadlock detection functionality is ideally invoked only in situations where design ground rules have not been followed (e.g., due to development engineering error) such that a deadlock actually occurs. Thus in one embodiment, if deadlock occurs, the system may waive mutual exclusion policy and simply grant multiple access. Subsequently, a system error is reported and a record is created listing the tasks and resources associated with the deadlock.

Multiple Record Locking

In general, software applications operate on many different resources. In many cases, resources are related, so that the application may need to operate on two or more resources at the same time. In one embodiment of the present invention, a scheme is implemented that allows the application to lock multiple resources at one time, and to derive a reference from one resource to another. For example, if a first resource ("resource X") contains a data element that is a reference to a second resource ("resource Y"), then the multiple record locking mechanism allows the application to lock both resource X and resource Y based on only a reference to resource X.

In the following discussion, it is assumed that there are two threads of logic in the application code. For example, the first thread of logic may be represented in computer source code as follows:

```
1: for each (X)
   {
     <operate on X>
     reference Y based on an element in X
     <operate on Y>
   }
```

Likewise, the second thread of logic may be represented in computer source code as follows:

```
2: for each (Y)
   {
     <operate on Y>
     reference X based on an element in Y
     <operate on X>
   }
```

If these two logic threads (denoted "1" and "2") were contained in different tasks, deadlock might occur if logic thread 1 locked resource X and then resource Y, while logic thread 2 locked resource Y and then resource X. Thus, resources X and Y must be locked in the same order in both cases to ensure that deadlock does not occur. However in logic thread 1, resource Y is not known before referencing resource X, since resource X contains the reference to resource Y (and vice versa in logic thread 2).

In one embodiment of the present invention, a mechanism is implemented to lock both resource X and resource Y to prevent such deadlock. In one embodiment, the multiple resource locking mechanism uses a list of resources to be locked (in this example, resources X and Y), a reference to resource X, and a method (function pointer) for deriving resource Y from resource X.

It should be noted that the multiple locking mechanism according to one embodiment, does not require the resources to be related. The resources can be completely independent of one another. Using the example above, instead of providing a method for deriving resource Y from resource X, an explicit reference to resource Y can be given in its place.

In an alternative embodiment of the present invention, the multiple lock mechanism is extended to work with more than two resources. For example, if there is a third resource ("resource Z") that is also referenced from X, it could also be locked at the same time.

In one embodiment of the present invention, the resources are locked in a specific order of priority. For this embodiment, the resources are first separated into two lists. The first list includes references resources (i.e., resources for which a reference has been provided, for example X). The second list includes derived resources (i.e., resources that do not have a reference, for example Y). Each of these lists is then sorted in order of descending priority.

Figure 6:
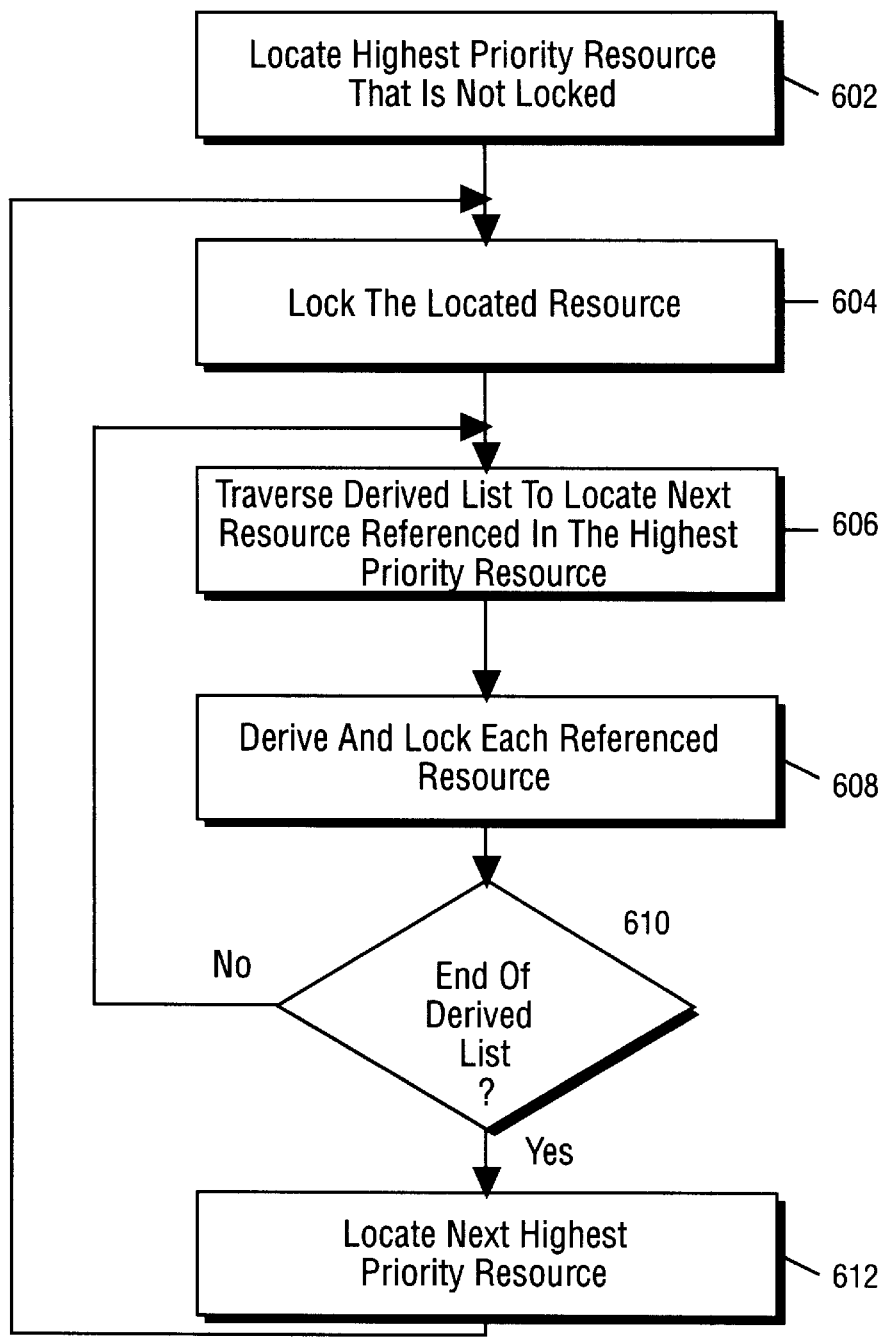
FIG. 6 is a flowchart that illustrates the steps of locking multiple resources, according to one embodiment of the present invention.

FIG. 6 is a flowchart that illustrates the steps of locking multiple resources, according to one embodiment of the present invention. In step 602, the highest priority resource from the reference list is located. If this resource is not already locked by the requesting task, the resource is then locked, step 604. Once the highest priority resource is locked, the derived list is traversed to locate any resources that are referenced in this resource, step 606. Since the derived list is sorted, the resources are examined from highest priority to lowest priority. For each referenced resource that is found, the system derives the resource and then locks it, step 608.

In step 610 it is determined whether the end of the derived list has been reached. If end of the derived list has not been reached, the method proceeds from step 606 in which the derived list is traversed to locate the next resource referenced by the highest priority task. When the end of the derived list is reached, the system finds the next highest priority resource from the reference list, step 612. The method then continues from step 604 until all of the resources are processed.

Figure 7:
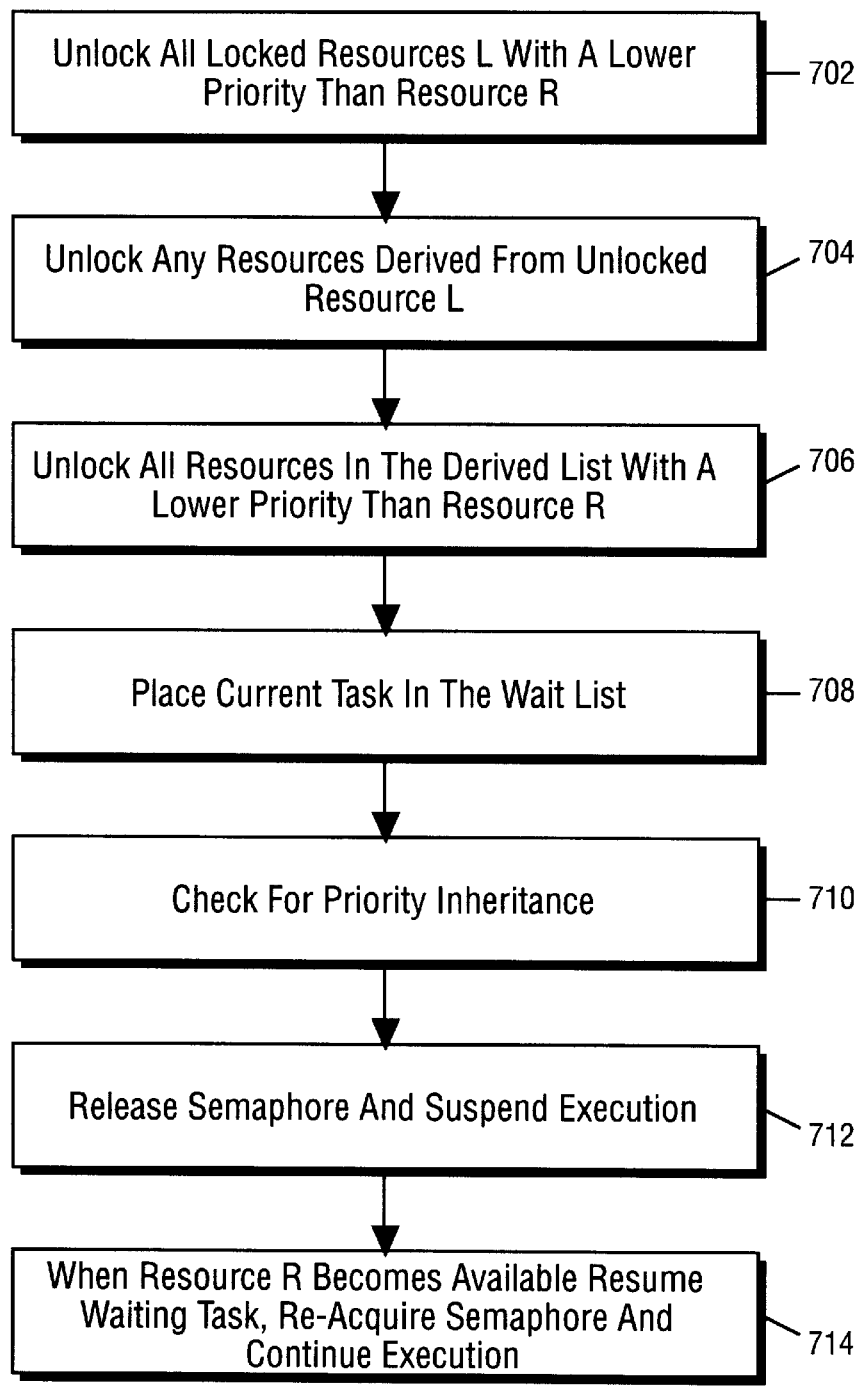
FIG. 7 is a flowchart that illustrates the steps of locking multiple resources in which a referenced resource cannot be locked, according to one embodiment of the present invention.

In certain circumstances, it may occur that a referenced resource cannot be locked. FIG. 7 is a flowchart that illustrates the steps of locking multiple resources in which a referenced resource cannot be locked, according to one embodiment of the present invention. In the following discussion, it is assumed that a first resource ("resource R") cannot be locked. In step 702 the system unlocks all locked resources L in the reference list with lower priority than resource R. For each resource L, the system traverses the derived list and unlocks any resource derived from these resources, step 704. The system next unlocks all locked resources in the derived list with lower priority than resource R, step 706. In step 708 the current task is placed in the wait list. In step 710 priority inheritance among the competing tasks is checked. The system then releases the semaphore and suspends execution, step 712. When resource R becomes available, and the task waiting for it is resumed, the system then re-acquires the semaphore and continues execution, step 714. In most cases, the system will continue execution from step 602 in the process outlined in FIG. 6.

The aforementioned principles concerning multiple read/single write functionality and deadlock detection (as opposed to prevention) apply equally to multiple record locking as single record locking.

In the foregoing, a system has been described for providing mutual exclusion of multiple tasks at the record level with priority inheritance and using one semaphore. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method to be performed by a software routine that is comprised of a plurality of tasks that may desire to lock or unlock any of plurality of resources, said method comprising:

maintaining a first list, said first list listing a first group of said tasks, wherein, each task listed within said first group of tasks is waiting in a suspended state for at least one of said resources to be freed;

maintaining a second list, said second list listing a second group of said tasks, wherein, each task listed within said second group of tasks is holding at least one of said resources;

suspending a first task and expanding said first list to include said first task upon said first task desiring to lock a resource that is being held by a second task, said second task being listed on said second list, said first task having a priority, said resource having any one of a plurality of different levels;

setting a flag to a first state as a consequence of said first task said desiring to lock said resource;

comparing said priority of said first task with the priority of said second task; and increasing the priority level of said second task to that of said first task if said second task has a lower priority than said first task.

2. The method of claim 1 wherein said second list further comprises a task name, an original priority level, and a current priority level for said each task within said second group.

3. The method of claim 2 wherein said flag is a mutual exclusion semaphore.

4. The method of claim 3 wherein said resource is a single data element represented as a record.

5. The method of claim 3 further comprising allowing each single task of said plurality of tasks to access only one of said plurality of resources at a given time.

6. The method of claim 3 further comprising:

allowing each single task of said plurality of tasks to access a plurality of resources of said one or more resources at a given time; and assigning a priority level to each accessed resource held by a single task if said single task accesses more than one resource of said plurality of resources at said given time.

7. The method of claim 1 further comprising:

determining whether a first resource of said plurality of resources contains a reference to a second resource of said plurality of references; and deriving said second resource from said reference if said first resource contains said reference.

8. The method of claim 7 further comprising:

storing, in a third list, an entry for each resource of said plurality of resources for which an explicit reference is available; and storing, in a fourth list, an entry for each resource of said plurality of resources which is derived from a reference that is contained in another resource of said plurality of resources.

9. The method of claim 8 further comprising:

identifying a highest priority unaccessed resource of said plurality of resources;

locking said highest priority unaccessed resource;

identifying additional resources of said plurality of resources referenced by said highest priority resource; and locking said additional resources.

10. The method of claim 9 further comprising:

determining whether a locked resource of said additional resources cannot be locked; and unlocking all locked resources having an entry in said third list that have a priority level lower than said locked resource.

11. The method of claim 1 further comprsing waving mutual exclusion policy if deadlock occurs between a third task and a fourth task of said plurality of tasks.

12. The method of claim 11 further comprising reporting a system error.

13. A method to be performed by a software routine that is comprised of a plurality of tasks that may desire to lock or unlock any of plurality of resources, said method comprising:

maintaining a first list, said first list listing a first group of said tasks, wherein, each task listed within said first group of tasks is waiting in a suspended state for at least one of said resources to be freed;

maintaining a second list, said second list listing a second group of said tasks, wherein, each task listed within said second group of tasks is holding at least one of said resources;

suspending a first task and expanding said first list to include said first task upon said first task desiring to lock a resource that is being held by a second task, said second task being listed on said second list, said first task having a priority, said resource having any one of a plurality of different levels;

setting a flag to a first state as a consequence of said first task said desiring to lock said resource;

comparing said priority of said first task with the priority of said second task; and increasing the priority level of said second task to that of said first task if said second task has a lower priority than said first task.

14. The method of claim 13 wherein said second list further comprises a task name, an original priority level, and a current priority level for said each task within said second group.

15. The method of claim 14 wherein said flag is a mutual exclusion semaphore.

16. The method of claim 15 wherein said resource is a single data element represented as a record.

17. The method of claim 15 further comprising allowing each single task of said plurality of tasks to access only one of said plurality of resources at a given time.

18. The method of claim 15, further comprising:

allowing each single task of said plurality of tasks to access a plurality of resources of said one or more resources at a given time; and assigning a priority level to each accessed resource held by a single task if said single task accesses more than one resource of said plurality of resources at said given time.

19. The method of claim 13 further comprising:

determining whether a first resource of said plurality of resources contains a reference to a second resource of said plurality of references; and deriving said second resource from said reference if said first resource contains said reference.

20. The method of claim 19 further comprising:

storing, in a third list, an entry for each resource of said plurality of resources for which an explicit reference is available; and storing, in a fourth list, an entry for each resource of said plurality of resources which is derived from a reference that is contained in another resource of said plurality of resources.

21. The method of claim 20 further comprising:

identifying a highest priority unaccessed resource of said plurality of resources;

locking said highest priority unaccessed resource;

identifying additional resources of said plurality of resources referenced by said highest priority resource; and locking said additional resources.

22. The method of claim 21 further comprising:

determining whether a locked resource of said additional resources cannot be locked; and unlocking all locked resources having an entry in said third list that have a priority level lower than said locked resource.

23. The method of claim 13 further comprising waiving mutual exclusion policy if deadlock occurs between a third task and a fourth task of said plurality of tasks.

24. The method of claim 23 further comprising reporting a system error.

* * * * *